(12) United States Patent
Krishnan et al.

(10) Patent No.: US 9,776,361 B2
(45) Date of Patent: Oct. 3, 2017

(54) POLISHING ARTICLES AND INTEGRATED SYSTEM AND METHODS FOR MANUFACTURING CHEMICAL MECHANICAL POLISHING ARTICLES

(71) Applicant: Applied Materials, Inc., Santa Clara, CA (US)

(72) Inventors: Kasiraman Krishnan, Milpitas, CA (US); Daniel Redfield, Morgan Hill, CA (US); Russell Edward Perry, Pleasanton, CA (US); Gregory E. Menk, Pleasanton, CA (US); Rajeev Bajaj, Fremont, CA (US); Fred C. Redeker, Fremont, CA (US); Nag B. Patibandla, Pleasanton, CA (US); Mahendra C. Orilall, Santa Clara, CA (US); Jason G. Fung, Sunnyvale, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 0 days.

(21) Appl. No.: 14/863,409

(22) Filed: Sep. 23, 2015

(65) Prior Publication Data

US 2016/0107381 A1    Apr. 21, 2016

Related U.S. Application Data

(60) Provisional application No. 62/065,533, filed on Oct. 17, 2014.

(51) Int. Cl.
*B29C 67/00* (2017.01)
*B24B 37/22* (2012.01)
(Continued)

(52) U.S. Cl.
CPC .......... *B29C 67/0059* (2013.01); *B24B 37/22* (2013.01); *B24B 37/26* (2013.01);
(Continued)

(58) Field of Classification Search
CPC . B29C 67/0059; B29C 67/0085; B24B 37/22; B24B 37/26; B29K 2105/16; B29K 2995/007; B29L 2031/736
(Continued)

(56) References Cited

U.S. PATENT DOCUMENTS 2,001,911 A * 5/1935 Wooddell ............... B24D 11/00
                                                           451/529
5,609,517 A * 3/1997 Lofaro .................... B24B 37/22
                                                           451/526
(Continued)

FOREIGN PATENT DOCUMENTS

KR    20130138841 A    12/2013
WO       9830356 A1     7/1998
(Continued)

OTHER PUBLICATIONS

International Search Report and Written Opinion for Application No. PCT/US2015/053465 dated Jan. 13, 2016; 10 pages.

*Primary Examiner* — George Nguyen
(74) *Attorney, Agent, or Firm* — Patterson + Sheridan LLP

(57) ABSTRACT

A polishing article manufacturing system includes a feed section and a take-up section, the take-up section comprising a supply roll having a polishing article disposed thereon for a chemical mechanical polishing process, a print section comprising a plurality of printheads disposed between the feed section and the take-up section, and a curing section disposed between the feed section and the take-up section,
(Continued)

the curing section comprising one or both of a thermal curing device and an electromagnetic curing device.

19 Claims, 8 Drawing Sheets

(51) Int. Cl.
    *B24B 37/26*     (2012.01)
    *B29K 105/16*     (2006.01)
    *B29L 31/00*     (2006.01)

(52) U.S. Cl.
    CPC ...... *B29C 67/0085* (2013.01); *B29K 2105/16* (2013.01); *B29K 2995/007* (2013.01); *B29L 2031/736* (2013.01)

(58) Field of Classification Search
    USPC .................................................. 451/524–540
    See application file for complete search history.

(56) References Cited

U.S. PATENT DOCUMENTS

| | | | |
|---|---|---|---|
| 5,624,303 A * | 4/1997 | Robinson | B24B 37/24 451/285 |
| 5,645,471 A * | 7/1997 | Strecker | B24B 21/16 451/299 |
| 5,944,583 A | 8/1999 | Cruz et al. | |
| 5,976,000 A * | 11/1999 | Hudson | B24B 37/24 451/526 |
| 6,022,264 A * | 2/2000 | Cook | B24B 37/26 451/37 |
| 6,036,579 A | 3/2000 | Cook et al. | |
| 6,121,143 A * | 9/2000 | Messner | B24B 37/04 156/345.12 |
| 6,210,254 B1 | 4/2001 | Cook et al. | |
| 6,213,845 B1 * | 4/2001 | Elledge | B24B 37/205 451/299 |
| 6,254,460 B1 * | 7/2001 | Walker | B24B 37/245 451/287 |
| 6,361,411 B1 * | 3/2002 | Chopra | B24B 21/04 451/285 |
| 6,390,890 B1 * | 5/2002 | Molnar | B24B 37/042 451/285 |
| 6,428,586 B1 | 8/2002 | Yancey | |
| 6,520,834 B1 * | 2/2003 | Marshall | B24B 37/04 451/10 |
| 6,544,373 B2 | 4/2003 | Chen | B24B 37/24 15/209.1 |
| 6,641,463 B1 * | 11/2003 | Molnar | B24B 37/042 451/285 |
| 6,833,046 B2 * | 12/2004 | Wright | B24B 21/04 156/345.12 |
| 7,132,033 B2 | 11/2006 | Boldizar et al. | |
| 7,517,488 B2 | 4/2009 | Saikin | |
| 7,530,880 B2 | 5/2009 | Bajaj et al. | |
| 7,815,778 B2 | 10/2010 | Bajaj | |
| 7,846,008 B2 | 12/2010 | Bajaj | |
| 8,066,555 B2 | 11/2011 | Bajaj | |
| 8,075,745 B2 | 12/2011 | Bajaj | |
| 8,177,603 B2 * | 5/2012 | Bajaj | B24B 37/24 451/41 |
| 8,292,692 B2 | 10/2012 | Bajaj | |
| 8,602,851 B2 | 12/2013 | Lombardo et al. | |
| 8,801,949 B2 | 8/2014 | Lakrout et al. | |
| 8,894,799 B2 | 11/2014 | Lakrout | |
| 9,067,299 B2 | 6/2015 | Bajaj et al. | |
| 9,108,291 B2 | 8/2015 | Lakrout | |
| 9,162,340 B2 | 10/2015 | Joseph et al. | |
| 2001/0041511 A1 | 11/2001 | Lack et al. | |
| 2002/0058468 A1 | 5/2002 | Eppert et al. | |
| 2002/0077036 A1 | 6/2002 | Roberts et al. | |
| 2003/0022611 A1 | 1/2003 | Bartlett et al. | |
| 2003/0153253 A1 | 8/2003 | Hanamoto et al. | |
| 2004/0003895 A1 * | 1/2004 | Amano | B24B 37/245 156/345.12 |
| 2004/0058623 A1 * | 3/2004 | Lin | B24B 37/22 451/41 |
| 2004/0106367 A1 | 6/2004 | Walker et al. | |
| 2004/0180611 A1 * | 9/2004 | Tajima | B24B 37/08 451/41 |
| 2006/0125133 A1 | 6/2006 | Huh et al. | |
| 2009/0011679 A1 * | 1/2009 | Bajaj | B24B 37/26 451/5 |
| 2012/0302148 A1 | 11/2012 | Bajaj et al. | |
| 2012/0315830 A1 | 12/2012 | Joseph et al. | |
| 2013/0137350 A1 * | 5/2013 | Allison | B24B 37/16 451/539 |
| 2013/0212951 A1 * | 8/2013 | Ahn | B24D 3/32 51/296 |
| 2015/0044951 A1 | 2/2015 | Bajaj et al. | |
| 2015/0126099 A1 | 5/2015 | Krishnan et al. | |
| 2016/0229023 A1 | 8/2016 | Lugg et al. | |

FOREIGN PATENT DOCUMENTS

| | | |
|---|---|---|
| WO | 0143920 A1 | 6/2001 |
| WO | 0153040 A1 | 7/2001 |
| WO | 01/64396 A1 | 9/2001 |
| WO | 0183167 A1 | 11/2001 |
| WO | 02/24415 A1 | 3/2002 |
| WO | 03103959 A1 | 12/2003 |
| WO | 2009158665 A1 | 12/2009 |
| WO | 2011082155 A2 | 7/2011 |
| WO | 2013162856 A1 | 10/2013 |

\* cited by examiner

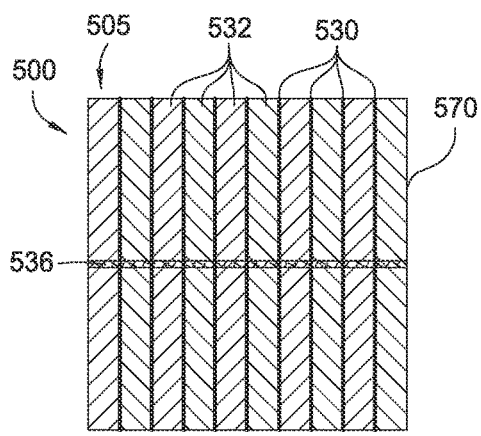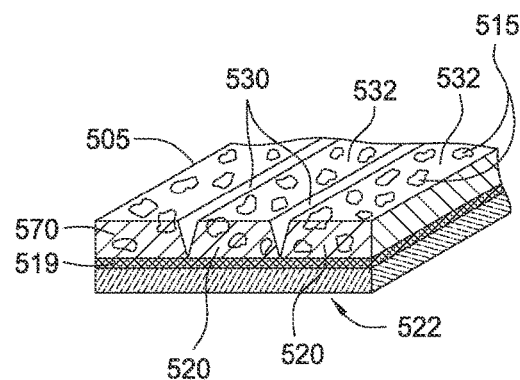
FIG. 5A  FIG. 5B
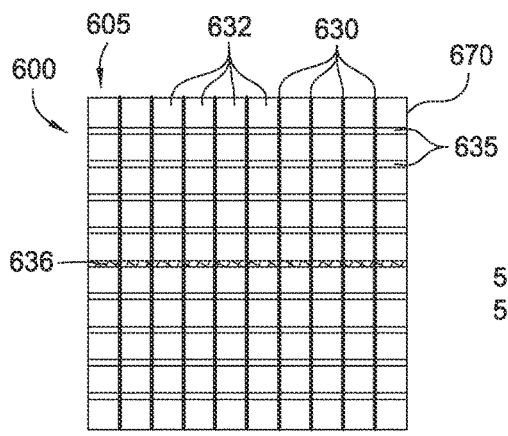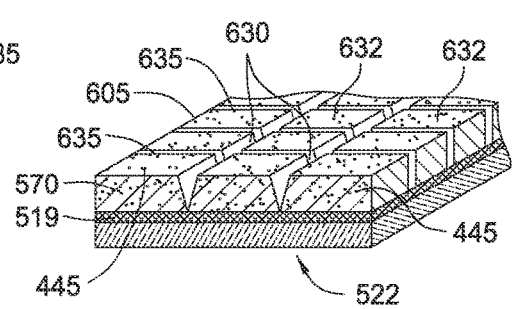
FIG. 6A  FIG. 6B
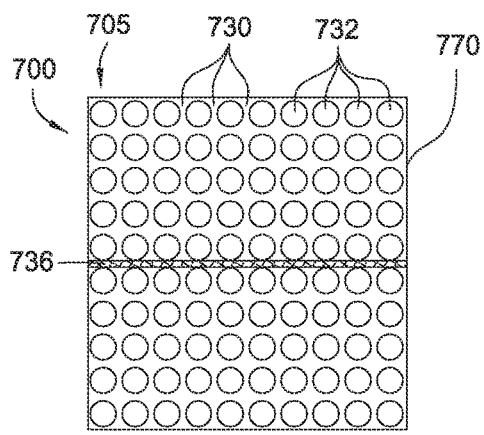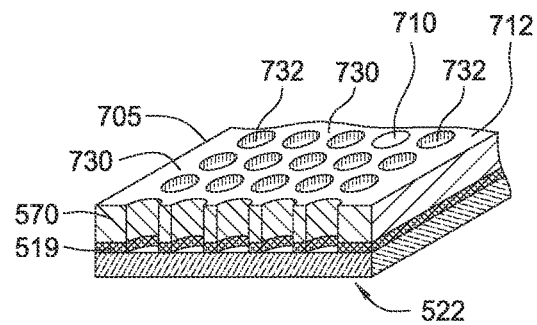
FIG. 7A  FIG. 7B

POLISHING ARTICLES AND INTEGRATED SYSTEM AND METHODS FOR MANUFACTURING CHEMICAL MECHANICAL POLISHING ARTICLES

CROSS-REFERENCE TO RELATED APPLICATION

This application claims benefit of U.S. Provisional Patent Application Ser. No. 62/065,533 filed Oct. 17, 2014, which is hereby incorporated by reference herein.

BACKGROUND

Field

Embodiments of the disclosure generally relate to an apparatus and method for chemical mechanical polishing of substrates or wafers, more particularly, to a polishing article manufacturing system and a method of manufacture of a polishing pad or polishing article for chemical mechanical polishing.

Description of the Related Art

In the fabrication of integrated circuits and other electronic devices on substrates, multiple layers of conductive, semiconductive, and dielectric materials are deposited on or removed from a feature side of a substrate. The sequential deposition and removal of these materials on the substrate may cause the feature side to become non-planar and require a planarization process, generally referred to as polishing, where previously deposited material is removed from the feature side of a substrate to form a generally even, planar or level surface. The process is useful in removing undesired surface topography and surface defects, such as rough surfaces, agglomerated materials, crystal lattice damage and scratches. The polishing process is also useful in forming features on a substrate by removing excess deposited material used to fill the features and to provide an even or level surface for subsequent deposition and processing.

One polishing process is known as Chemical Mechanical Polishing (CMP) where a substrate is placed in a substrate carrier assembly and controllably urged against a polishing media mounted to a moving platen assembly. The polishing media is typically a polishing article or polishing pad. The carrier assembly provides rotational movement relative to the moving platen and material removal is accomplished by chemical activity, mechanical abrasion, or a combination of chemical activity and mechanical abrasion between the feature side of the substrate and the polishing media.

However, the polishing process results in "glazing" or smoothening of a polishing surface of the polishing media, which reduces film removal rate. The surface of the polishing media is then "roughened" or conditioned to restore the polishing surface, which enhances local fluid transport and improves removal rate. Typically, conditioning is performed, in between polishing two wafers or in parallel with polishing the wafer, with a conditioning disk coated with abrasives such as micron sized industrial diamonds. The conditioning disk is rotated and pressed against the surface of the media and mechanically cuts the surface of the polishing media. However, while the rotation and/or down force applied to the conditioning disk is controlled, the cutting action is relatively indiscriminate, and the abrasives may not cut into the polishing surface evenly, which creates a differential in surface roughness across the polishing surface of the polishing media. As the cutting action of the conditioning disk is not readily controlled, the media life may be shortened. Further, the cutting action of the conditioning disk sometimes produces large asperities in the polishing surface, along with pad debris. While the asperities are beneficial in the polishing process, the asperities may break loose during polishing, which creates debris that, along with pad debris from cutting action, contributes to defects in the substrate.

Numerous other methods and systems that act on the polishing surface of the polishing article have been performed in an attempt to provide uniform conditioning of the polishing surface. However, control of the devices and systems (e.g., cutting action, down force, among other metrics) remain unsatisfactory and may be frustrated by the properties of the polishing media itself. For example, properties such hardness and/or density of the pad media may be non-uniform, which leads to more aggressive conditioning on some portions of the polishing surface relative to other portions.

Therefore, there is a need for a polishing article having properties that facilitate uniform polishing and conditioning.

SUMMARY

Embodiments of the disclosure generally relate to an apparatus and method for chemical mechanical polishing of substrates or wafers, more particularly, to a polishing article, a polishing article manufacturing system and a method of manufacture of a polishing article for chemical mechanical polishing.

In one embodiment, a polishing article manufacturing system includes a feed section and a take-up section, the take-up section comprising a supply roll having a polishing article disposed thereon for a chemical mechanical polishing process, a print section comprising a plurality of printheads disposed between the feed section and the take-up section, and a curing section disposed between the feed section and the take-up section, the curing section comprising one or both of a thermal curing device and an electromagnetic curing device.

In another embodiment, a polishing article is provided and includes a composite pad body. The composite pad body includes a plurality of polishing features forming a polishing surface, wherein the plurality of polishing features are formed from a first material, and one or more base features formed from a second material, wherein the one or more base features surround the plurality of polishing features to form a unitary body and the first material has a hardness greater than a hardness of the second material In another embodiment, a replacement supply roll for a chemical mechanical polishing process is provided and includes a rod having a polishing article wound thereon. The polishing article includes a composite pad body, comprising a plurality of polishing features forming a polishing surface, wherein the plurality of polishing features are formed from a first material, and one or more base features formed from a second material, wherein the one or more base features surround the plurality of polishing features to form a unitary body and the first material has a hardness greater than a hardness of the second material.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 5A is a top view of one embodiment of a polishing article assembly.

FIG. 5B is an enlarged isometric view of a portion of the polishing article assembly shown in FIG. 5A.

FIG. 6A is a top view of another embodiment of a polishing article assembly.

FIG. 6B is an enlarged isometric view of a portion of the polishing article assembly in FIG. 6A.

FIG. 7A is a top view of another embodiment of a polishing article assembly.

FIG. 7B is an enlarged isometric view of a portion of the polishing article assembly shown in FIG. 6A.

To facilitate understanding, common words have been used, where possible, to designate identical elements that are common to the figures. It is contemplated that elements disclosed in one embodiment may be beneficially utilized on other embodiments without specific recitation.

DETAILED DESCRIPTION

Figure 1:
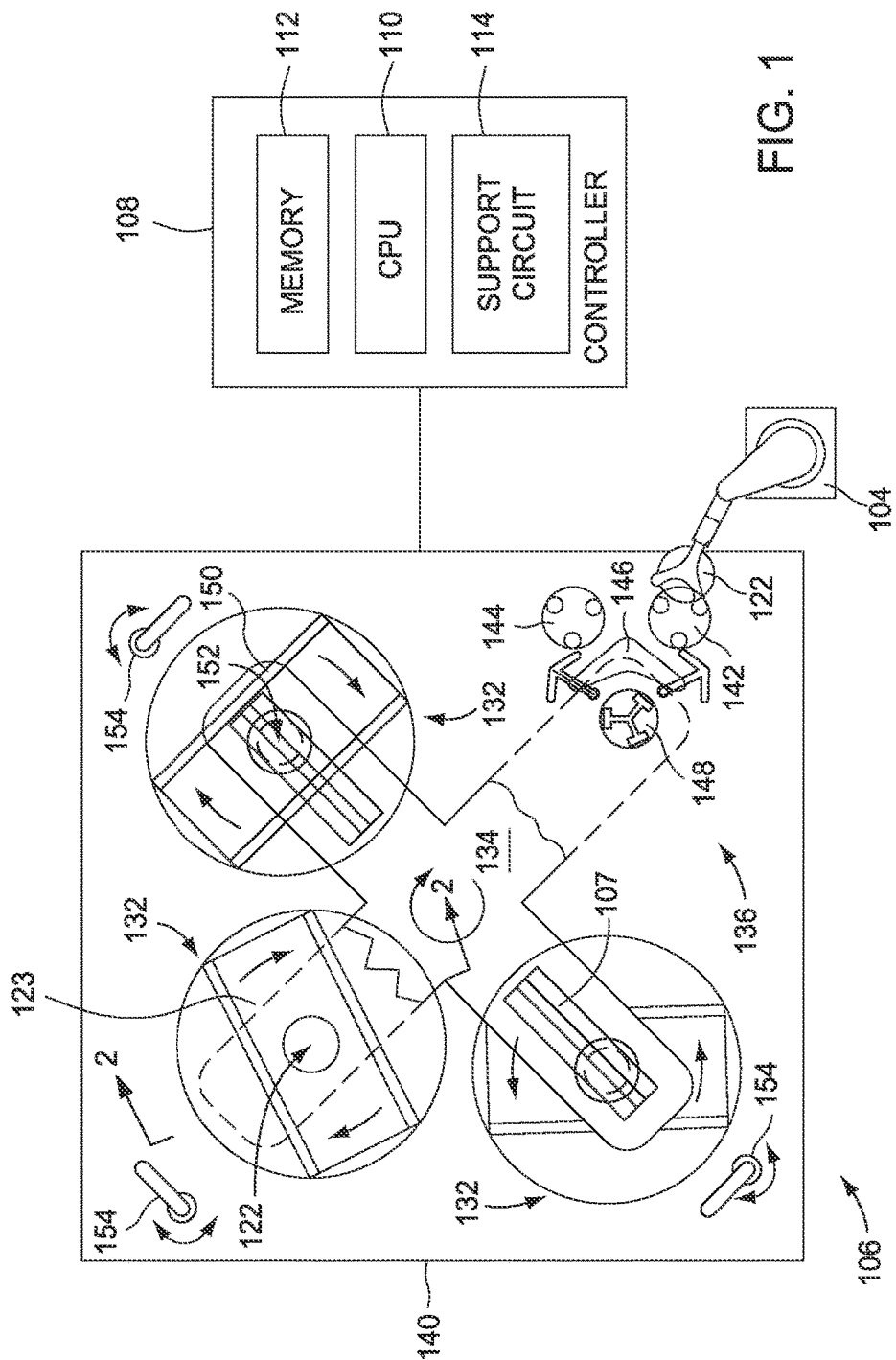
FIG. 1 is a plan view of an exemplary chemical mechanical polishing module.

FIG. 1 depicts a plan view of a polishing module 106 which is a portion of a REFLEXION® Chemical Mechanical Polisher, manufactured by Applied Materials, Inc., located in Santa Clara, Calif. Embodiments described herein may be used on this polishing system. However, one skilled in the art may advantageously adapt embodiments as taught and described herein to be employed on other chemical mechanical polishers produced by other manufacturers that utilize polishing material, and particularly polishing material in a roll format.

The polishing module 106 generally comprises a loading robot 104, a controller 108, a transfer station 136, a plurality of processing or polishing stations, such as platen assemblies 132, a base 140 and a carousel 134 that supports a plurality of polishing or carrier heads 152 (only one is shown in FIG. 1). Generally, the loading robot 104 is disposed proximate the polishing module 106 and a factory interface 102 (not shown) to facilitate the transfer of substrates 122 therebetween.

The transfer station 136 generally includes a transfer robot 146, an input buffer 142, an output buffer 144 and a load cup assembly 148. The input buffer station 142 receives a substrate 122 from the loading robot 104. The transfer robot 146 moves the substrate 122 from the input buffer station 142 and to the load cup assembly 148 where it may be transferred to the carrier head 152.

To facilitate control of the polishing module 106 as described above, the controller 108 comprises a central processing unit (CPU) 110, support circuits 146 and memory 112. The CPU 110 may be one of any form of computer processor that can be used in an industrial setting for controlling various polishers, drives, robots and sub-processors. The memory 112 is coupled to the CPU 110. The memory 112, or computer-readable medium, may be one or more of readily available memory such as random access memory (RAM), read only memory (ROM), floppy disk, hard disk, or any other form of digital storage, local or remote. The support circuits 114 are coupled to the CPU 110 for supporting the processor in a conventional manner. These circuits include cache, power supplies, clock circuits, input/output circuitry, subsystems, and the like.

Generally, the carousel 134 has a plurality of arms 150 that each support one of the carrier heads 152. Two of the arms 150 depicted in FIG. 1 are shown in phantom such that the transfer station and a planarizing or polishing article 123 disposed on one of the platen assemblies 132 may be seen. The carousel 134 is indexable such that the carrier heads 152 may be moved between the platen assemblies 132 and the transfer station 136.

Typically, a chemical mechanical polishing process is performed at each platen assembly 132 by moving the substrate 122 retained in the carrier head 152 relative to the polishing article 123 supported on the platen assembly 132. The polishing article 123 may have a smooth surface, a textured surface, a surface containing abrasives, or a combination thereof. Additionally, the polishing article 123 may be advanced across or releasably fixed to the polishing surface. Typically, the polishing article 123 is releasably fixed by vacuum, mechanical clamps or by other holding methods to the platen assembly 132.

Embodiments of the polishing article 123 may comprise a polymer material that is produced by a three-dimensional (3D) printing process according to embodiments described herein. The polishing article 123 may include nano-sized features (e.g., particles and/or discrete regions or domains within a polymer matrix having sizes of about 10 nanometers to about 200 nanometers). The polishing process may utilize a slurry containing abrasive particles delivered to the pad surface by fluid nozzles 154 to aid in polishing the substrate 122. The fluid nozzles 154 may rotate in the direction shown to a position clear of the platen assemblies 132 as shown, to a position over each of the platen assemblies 132.

3D printing as described herein includes, but is not limited to, polyjet deposition, inkjet printing, fused deposition modeling, binder jetting, powder bed fusion, selective laser sintering, stereolithography, vat photopolymerization digital light processing, sheet lamination, directed energy deposition, among other 3D deposition or printing processes.

Figure 2:
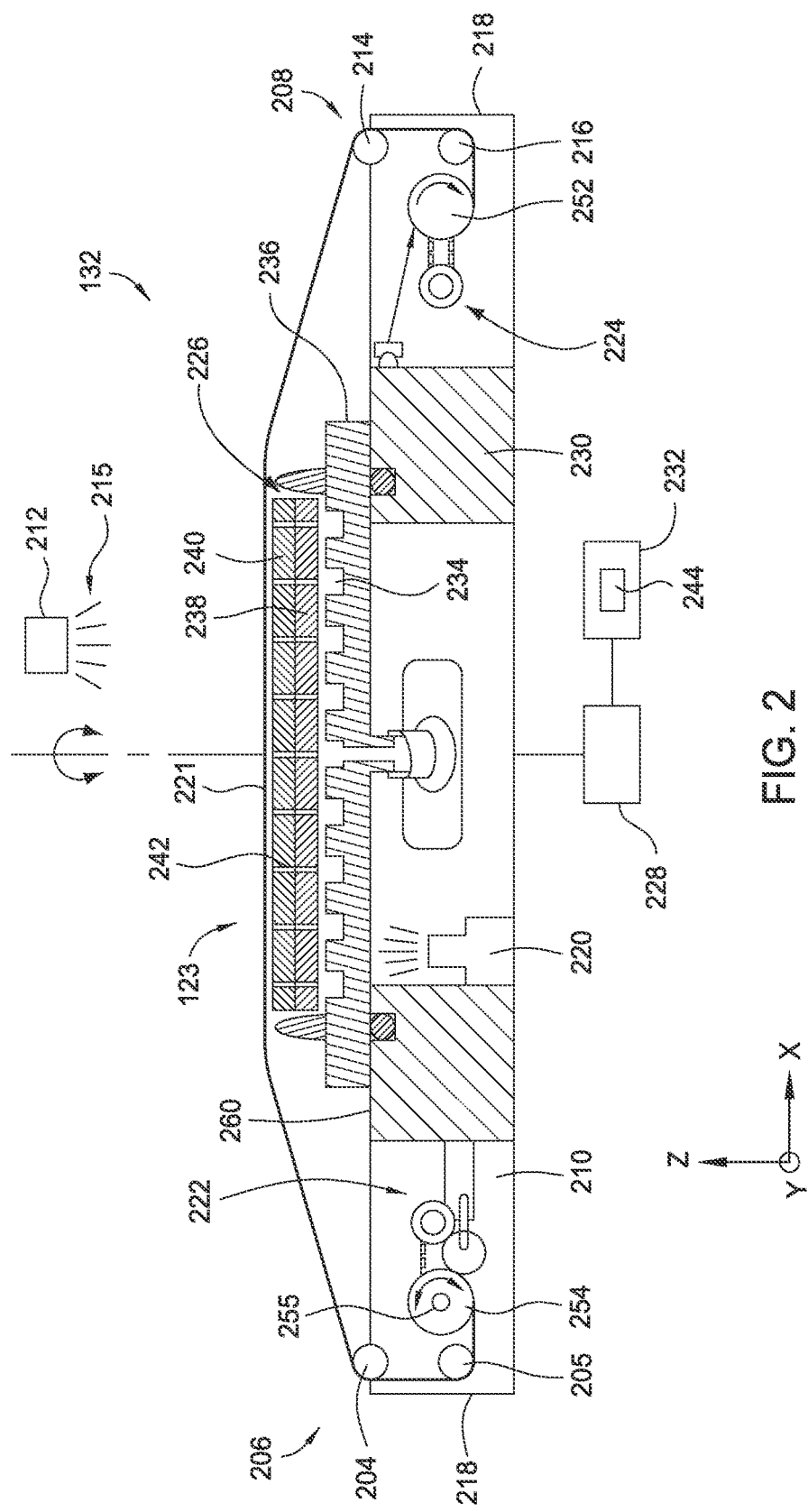
FIG. 2 is a sectional view of an exemplary processing station of the module of FIG. 1.

FIG. 2 depicts a side view of the platen assembly 132 and an exemplary supply assembly 206 and a take up assembly 208, illustrating the position of the polishing article 123 across a platen 230. Generally, the supply assembly 206 includes the supply roll 254, an upper guide member 204 and a lower guide member 205 that are disposed between a side wall 218 of the platen assembly 132. The polishing article 123 may be wound about a rod 255, which may be a tubular member or a dowel. Generally, the take-up assembly 208 includes the take-up roll 252, an upper guide member 214 and a lower guide member 216 that are all disposed between the sidewalls 218. The take-up roll 252 generally contains a used portion of polishing article 123 and is configured so that it may easily be replaced with an empty take-up roll once take-up roll 252 is filled with used polishing article 123. The upper guide member 214 is positioned to lead the polishing article 123 from the platen 230 to the lower guide member 216. The lower guide member 216 leads the polishing article 123 onto the take-up roll 252. The platen assembly 132 may also comprise an optical sensing device 220, such as a laser, adapted to transmit and receive optical signals for detecting an endpoint to the planarizing or polishing process performed on a substrate.

The supply roll 254 generally contains an unused portion of polishing article 123 and is configured so that it may easily be replaced with another supply roll 254 containing a new polishing article 123 once the polishing article 123 disposed on the supply roll 254 has been consumed by the polishing or planarizing process. In some embodiments, an energy source 212 may be positioned to apply electromagnetic energy 215 toward an upper surface 221 of the polishing article 123 that is disposed between the supply roll 254 and the take-up roll 252. The electromagnetic energy 215 may be in the form of a beam or a flood of energy and may be used to selectively interact (i.e., ablate and/or heat) with discrete regions of the upper surface 221 of the polishing article 123. The electromagnetic energy 215 may be an electron beam or beams, a laser beam or beams, and combinations thereof. The electromagnetic energy 215 may be used to condition the upper surface 221 of the polishing article 123 before, during or after a polishing process. In some embodiments, the electromagnetic energy 215 is utilized to condition the upper surface 221 of the polishing article 123 during polishing in order to tune the polishing process.

The upper surface 221 of the polishing article 123 is generally configured to controllably advance the polishing article 123 in the X direction across a backing pad assembly 226. The polishing article 123 is generally moved in relation to the platen 230 by balancing the forces between a motor 222 coupled to the supply assembly 206 and a motor 224 coupled to the take-up assembly 208. Ratchet mechanisms and/or braking systems (not shown) may be coupled to one or both of the supply assembly 206 and the take-up assembly 208 to fix the polishing article 123 relative to the backing pad assembly 226. The platen 230 may be operably coupled to a rotary actuator 228 that rotates the platen assembly 132 about a rotational axis generally orthogonal to the X and/or Y directions. A vacuum system 232 may be coupled between the actuator 228 and the backing pad assembly 226. The vacuum system 232 may be used to fix the position of the polishing article 123 onto the platen 230. The vacuum system 232 may include channels 234 formed in a plate 236 disposed below the backing pad assembly 226. The backing pad assembly 226 may include a sub-pad 238 and a subplate 240, each having openings 242 formed therethrough that are in fluid communication with the channels 234 and a vacuum source 244. The sub-pad 238 is typically a plastic, such as polycarbonate or foamed polyurethane. Generally, the hardness or durometer of the sub-pad 238 may be chosen to produce a particular polishing result. The sub-pad 238 generally maintains the upper surface 221 of the polishing article 123 in a plane that is parallel to the plane of a substrate (not shown) in order to promote global planarization of the substrate. The subplate 240 is positioned between the sub-pad 238 and the bottom of the platen 230 such that the upper surface of the sub-pad 238 is maintained generally parallel to a top surface 260 of the platen 230.

Figure 3A:
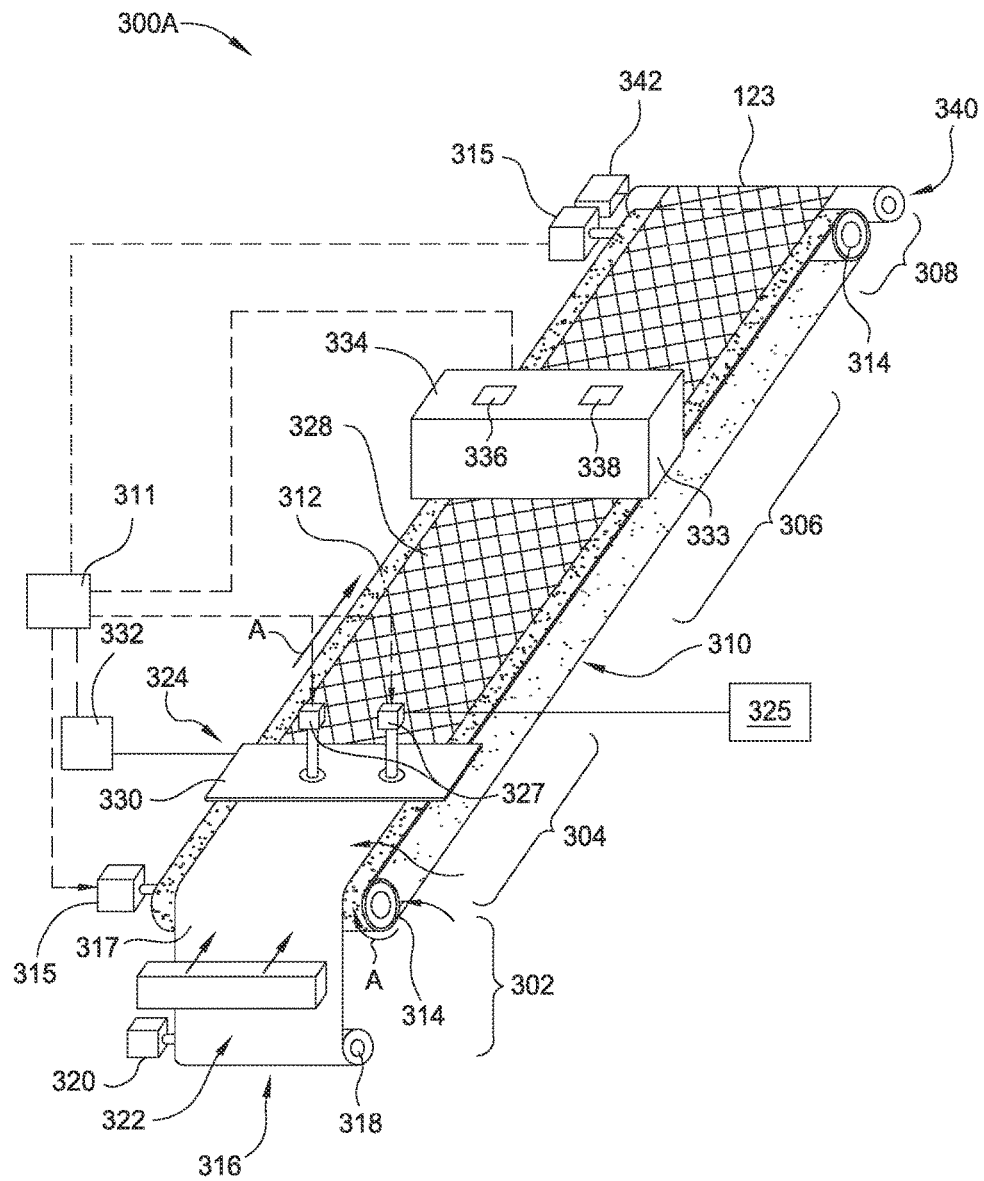
FIG. 3A is a schematic isometric view of one embodiment of a roll-to-roll pad manufacturing system.

FIG. 3A is a schematic isometric view of one embodiment of a pad manufacturing system 300A for preparing a polishing article 123 that may be used on the platen assembly 132 of FIG. 2. In one embodiment, the pad manufacturing system 300A generally includes a feed section 302, a print section 304, a curing section 306 and a pad wind-up section 308. The pad manufacturing system 300A also includes a conveyor 310 including a web 312 disposed between at least two rollers 314. One or both of the rollers 314 may be coupled to a drive motor 315 that rotates the rollers 314 and/or the web 312 in the direction depicted by the arrow indicated as A. The feed section 302, the print section 304, the curing section 306 and the pad wind-up section 308 may be operably coupled to a controller 311. The conveyor 310 may be operated to move continuously or intermittently by the controller 311.

The feed section 302 may include a supply roll 316 that is operably coupled to the conveyor 310. The supply roll 316 may be a backing material 317, such a polymeric material, for example, a biaxially-oriented polyethylene terephthalate (BoPET) material. The supply roll 316 may be disposed on a feed roller 318 that is driven or controlled by a motion control device 320. The motion control device 320 may be a motor and/or include a brake system that provides a predetermined tension on the supply roll 316 such that the unwinding speed of the supply roll 316 is driven by the drive motor 315 and/or the web 312. The feed section 302 may also include a pretreatment device 322. The pretreatment device 322 may be configured to spray or otherwise provide a coating onto the backing material 317 prior to printing at the print section 304. In some embodiments, the pretreatment device 322 may be utilized to heat the backing material 317 prior to printing at the print section 304.

The print section 304 includes a 3D printing station 324 disposed downstream of the feed section 302. The print section 304 utilizes one or more print heads 327 to provide a patterned surface 328 onto the backing material 317. The print section 304 may include a movable platform 330 that is coupled to a motion control device 332 that may be utilized to move the print heads 327 relative to the backing material 317 and the web 312.

The print heads 327 may be coupled to a material source 325 having print materials that may be used to form the patterned surface 328. Print materials may include polymeric materials such as polyurethanes, polycarbonates, fluoropolymers, PTFE, PTFA, polyphenylene sulfide (PPS), or combinations thereof. Examples also include polyvinyl alcohols, pectin, polyvinyl pyrrolidone, hydroxyethylcellulose, methylcellulose, hydropropylmethylcellulose, carboxymethylcellulose, hydroxypropylcellulose, polyacrylic acids, polyacrylamides, polyethylene glycols, polyhydroxyetheracrylites, starches, maleic acid copolymers, polyethylene oxide, polyurethanes and combinations thereof.

In one embodiment, a polymeric material may be deposited as a base material on the backing material 317. The polymeric material formed may comprise an open-pored or closed-pored polyurethane material, and may include nanoscale particles interspersed therein. The particles may include organic nanoparticles. In one embodiment, the nanoparticles may include molecular or elemental rings and/or nanostructures. Examples include allotropes of carbon (C), such as carbon nanotubes and other structures, molecular carbon rings having 5 bonds (pentagonal), 6 bonds (hexagonal), or more than 6 bonds. Other examples include fullerene-like supramolecules. In another embodiment, the nano-scale particles may be a ceramic material, alumina, glass (e.g., silicon dioxide ($SiO_2$)), and combinations or derivatives thereof. In another embodiment, the nano-scale particles may include metal oxides, such as titanium (IV) oxide or titanium dioxide ($TiO_2$), zirconium (IV) oxide or zirconium dioxide ($ZrO_2$), combinations thereof and derivatives thereof, among other oxides.

The patterned surface 328 formed by the print heads 327 may comprise a composite base material, such as a polymeric matrix, which may be formed from urethanes, melamines, polyesters, polysulfones, polyvinyl acetates, fluorinated hydrocarbons, and the like, and mixtures, copolymers and grafts thereof. In one embodiment, the polymeric matrix comprises a urethane polymer that may be formed from a polyether-based liquid urethane. The liquid urethane may be reactive with a polyfunctional amine, diamine, triamine or polyfunctional hydroxyl compound or mixed functionality compounds, such as hydroxyl/amines in urethane/urea cross-linked compositions that form urea links and a cross-linked polymer network when cured.

The curing section 306 includes a curing device 333 that may be disposed in or on a housing 334. The housing 334 is disposed over the web 312 such that the web 312 and the patterned surface 328 on the backing material 317 may pass thereunder. The curing device 333 may be a thermal oven, an ultraviolet (UV) light emitter, or combinations thereof. In one embodiment, the curing device 333 may include one or both of a laser source 336 and an electron beam emitter 338 that may be used to cure the material deposited by the print heads 327 forming the patterned surface 328. In some embodiments, when the electron beam emitter is utilized, the pad manufacturing system 300A may be positioned in an enclosure where the pressure can be controlled. The laser source 336 and the electron beam emitter 338 may be utilized alone or in combination with the thermal or UV energy. In some embodiments, the laser source 336 and the electron beam emitter 338 may be used in a spot curing process where specific portions of the patterned surface 328 are targeted. The spot targeting by the laser source 336 or the electron beam emitter 338 may heat discrete regions of the patterned surface 328 to create a surface of the discrete regions that may be harder or less compressible than the surrounding portions. The laser source 336 may also be used to ablate portions of the patterned surface 328 to create a fine texture thereon.

The pad wind-up section 308 includes a take-up roll 340 where the polishing article 123 may be wound. The take-up roll 340 may be removed from the pad manufacturing system 300A to be utilized as the supply roll 254 in the platen assembly 132 of FIG. 2. During manufacturing, the take-up roll 340 may be coupled to a motion control device 342. The motion control device 342 may be a motor and/or include a brake system that controls the winding speed of the take-up roll 340.

Figure 3B:
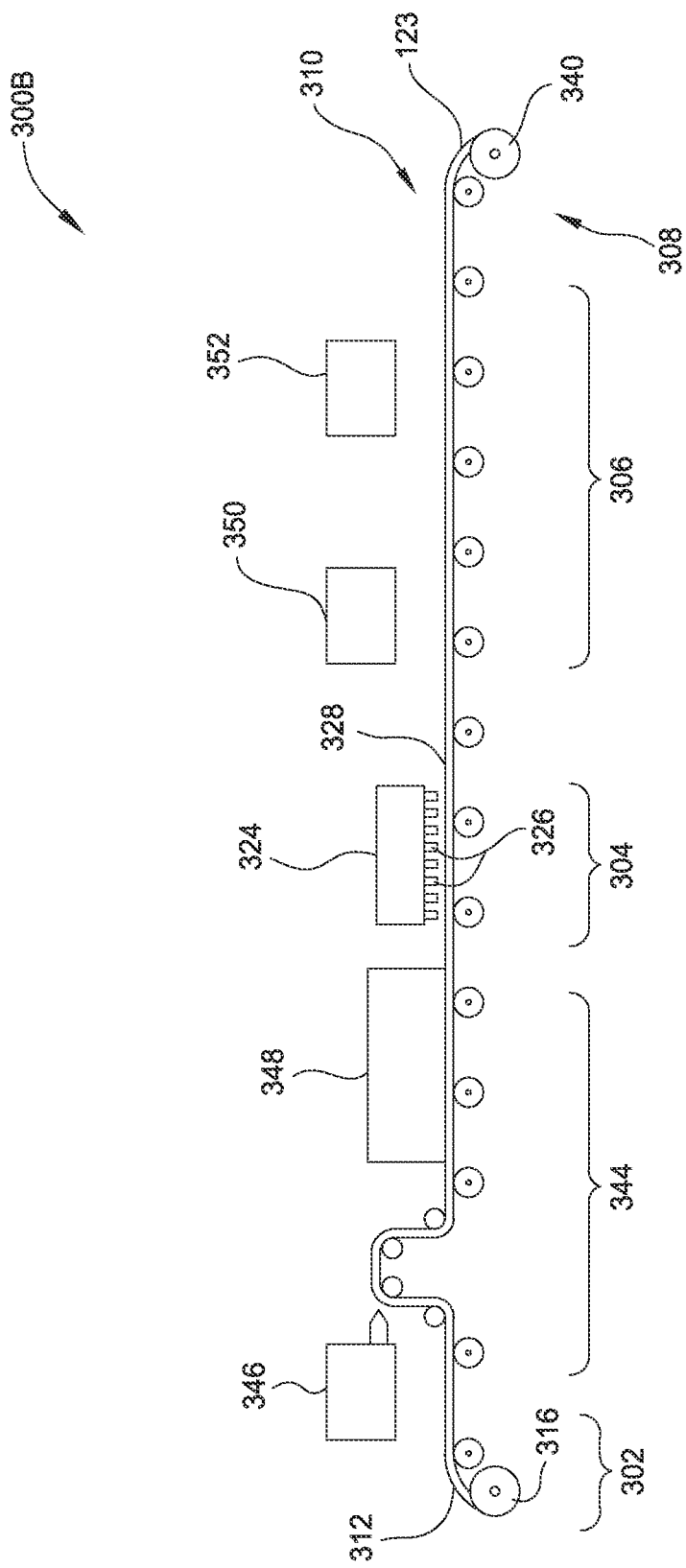
FIG. 3B is a schematic side view of another embodiment of a roll-to-roll pad manufacturing system.

FIG. 3B is a schematic side view of another embodiment of a pad manufacturing system 300B. The pad manufacturing system 300B includes the conveyor 310 having the feed section 302, the print section 304, the curing section 306 and the pad wind-up section 308 that may be similar to the pad manufacturing system 300A of FIG. 3A. However, the pad manufacturing system 300B includes a supply roll 316 that controllably unwinds a web 312 that moves over the conveyor 310 to the take-up roll 340. The web 312 may be a backing material similar to the backing material 317 described in FIG. 3A. Motion of the web 312 as well as the conveyor 310 and the take-up roll 340 may be controlled by motion control devices and a controller similar to the pad manufacturing system 300A described in FIG. 3A and the description is omitted in FIG. 3B for brevity.

The pad manufacturing system 300B includes an optional pretreatment section 344 positioned between the feed section 302 and the print section 304. The pretreatment section 344 may be used to form an adhesive or release layer onto the web 312. Alternatively, an adhesive or release layer may be formed at the print section 304 using the 3D printing station 324. When the pretreatment section 344 is used, a slot/die coater 346 may be used to deposit a layer or layers onto the web 312. Additionally, a curing station 348, utilizing UV light or heating elements, may be used to cure material deposited by the slot/die coater 346.

In this embodiment, the 3D printing station 324 comprises an array of print heads 327. The print heads 327 may be used to optionally form an adhesive or release layer on the web 312 as well as to form the patterned surface 328 on the web 312. In one example, multiple rows and columns of print heads 327 may span the width of the conveyor 310 and a portion of the length of the conveyor 310. In some embodiments, one or more of the print heads 327 may be movable relative to the conveyor 310. The print heads 327 would be coupled to the material source 325 as described in FIG. 3A.

The curing section 306 may include one or both of an optional electromagnetic energy source 350 and a thermal curing device 352. The electromagnetic energy source 350 may be one or a combination of a laser source or an electron beam emitter as described in FIG. 3A. The thermal curing device 352 may be an oven or a UV light array.

The pad wind-up section 308 includes the take-up roll 340 where the polishing article 123 may be wound. The take-up roll 340 may be removed from the pad manufacturing system 300A to be utilized as the supply roll 254 in the platen assembly 132 of FIG. 2.

Figure 4A:
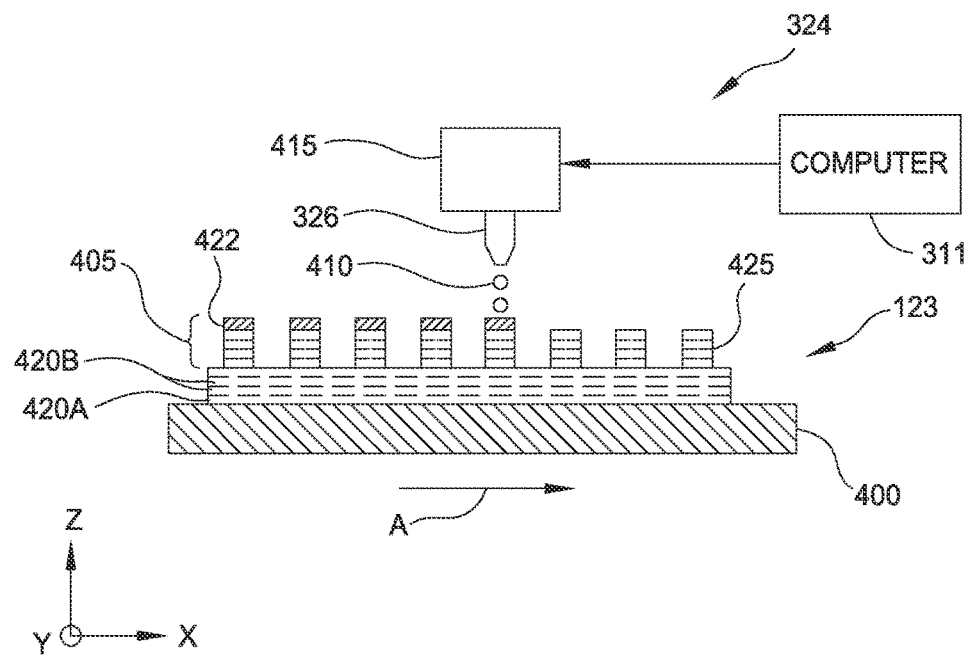
FIG. 4A is a schematic cross-sectional view of one embodiment of a 3D printing station that may be used in the pad manufacturing system of FIG. 3A or the pad manufacturing system of FIG. 3B.

FIG. 4A is a schematic cross-sectional view of one embodiment of a 3D printing station 324 that may be used in the pad manufacturing system 300A of FIG. 3A or the pad manufacturing system 300B of FIG. 3B. FIG. 4A shows a portion of one embodiment of a polishing article 123 manufactured using a 3D printing process. 3D printing offers a convenient and highly controllable process for producing polishing articles with abrasives embedded in specific locations within the polishing layer. The polishing article 123 may be printed on a support 400, which may be the backing material 317 of FIG. 3A or the web 312 of FIG. 3B.

Referring to FIG. 4A, at least a polishing layer 405 of the polishing article 123 is manufactured using a 3D printing process. In the manufacturing process, thin layers of material are progressively deposited and fused on the support 400 while the support is moved along the arrow indicated by A (in the X direction). For example, droplets 410 of pad precursor material (from the material source 325 of FIG. 3A) can be ejected from a nozzle 326 of a droplet ejecting printer 415 to form a plurality of layers 420A, 420B and 422. The layers may form a solidified material 425 comprising the pad precursor material enabling sequential deposition of other layers thereon. The droplet ejecting printer 415 may be similar to an inkjet printer, but uses the pad precursor material rather than ink. The nozzle 326 may be translated in one or both of the X and the Y direction while the support 400 is continuously or intermittently moved in the X direction during manufacturing.

In one example, a first layer 420A may be deposited by ejection of droplets 410 onto the support 400. Subsequent layers, such as layers 420B and 422 (other layers therebetween are not called out for brevity), can be deposited on the first layer 420A after solidification. After each layer is solidified, a new layer is then deposited over the previously deposited layer until the full 3-dimensional polishing layer 405 is fabricated. Solidification can be accomplished by polymerization. For example, the layers of pad precursor material can be a monomer, and the monomer can be polymerized in-situ by UV curing or thermally. The pad precursor material can be cured effectively immediately upon deposition, or an entire layer of pad precursor material can be deposited and then the layer can be cured simultaneously.

Each layer may be applied by the nozzle 326 in a pattern stored in a 3D drawing computer program that is provided on a controller 311. Each layer 420A, 420B and 422 may be less than 50% or less than the total thickness of the polishing layer 405. In one example, each layer 420A, 420B and 422 may be less than 10% of the total thickness of the polishing layer 405, for example less than 5%, such as about less than 1% of the total thickness of the polishing layer 405. In one embodiment, the thickness of each layer may include a thickness of about 30 microns to about 60 microns or less, such as on the order of nanometers (e.g., 1 to 100 nanometers), and even to picoscale dimensions (e.g., picoscale ($10^{-12}$ meters).

The support 400 can be a rigid base, or a flexible film, such as a layer of polytetrafluoroethylene (PTFE). If the support 400 is a film, then the support 400 can form a portion of the polishing article 123. For example, the support 400 can be the backing material 317 or a layer between the backing material 317 and the polishing layer 405. Alternatively, the polishing layer 405 can be removed from the support 400 and the layers 420A and 420B may form the backing layer material.

In some embodiments, abrasive particles may be dispersed in the droplets 410 of pad precursor material. The abrasive particles may be locally dispensed into polishing layer 405 during formation of each of the layers. Local dispensing of the abrasive particles may assist in minimization of agglomeration. In some embodiments, abrasive particles can be premixed with a liquid thermoset polymer precursor. Continuous agitation of the mixture of the thermoset polymer precursor and the abrasive particles prevents agglomeration of the particles, similar to apparatus used to homogenize ink pigments used in ink jet printers. In addition, the continuous agitation of the mixture ensures fairly uniform distribution of the abrasive particles in the precursor material. This can result in a more uniform distribution of particles through the polishing layer, which can lead to improved polishing uniformity and can also help avoid agglomeration.

The premixed mixture may be dispensed from a single nozzle (e.g., the nozzle 326) according to a particular pattern. For example, the premixed mixture can be uniformly dispensed to produce a homogeneous polishing layer 405 having a uniform distribution of embedded abrasive particles throughout the thickness of the polishing layer 405.

Figure 4B:
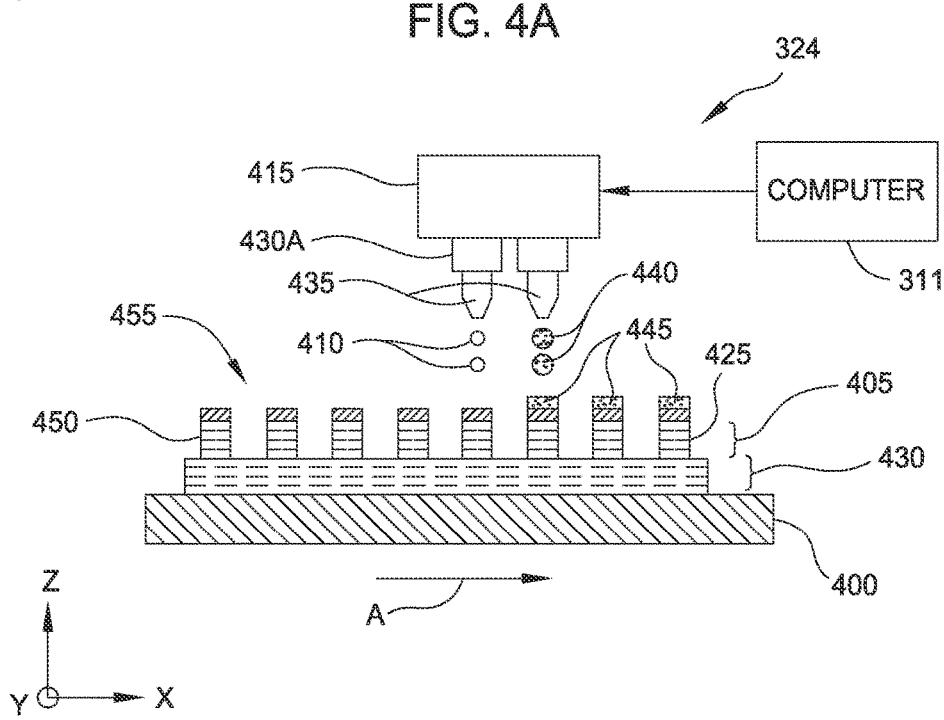
FIG. 4B is a schematic cross-sectional view of one embodiment of a 3D printing station that may be used in the pad manufacturing system of FIG. 3A or the pad manufacturing system of FIG. 3B.

FIG. 4B is a schematic cross-sectional view of one embodiment of a 3D printing station 324 that may be used in the pad manufacturing system 300A of FIG. 3A or the pad manufacturing system 300B of FIG. 3B. In FIG. 4B, a cross-sectional view of a portion of another embodiment of a polishing article 123 manufactured using a 3D printing process is illustrated. The polishing article 123 is formed by the droplet ejecting printer 415 to include a plurality of structures 450 separated by grooves 455 based on instructions from a CAD program. The structures 450 and grooves 455 may form the polishing layer 405. A sub-layer 430 may also be formed with the polishing article 123 by the droplet ejecting printer 415. The sub-layer 430 may be the backing material 317 (shown in FIG. 3A). For example, the sub-layer 430 and the polishing layer 405 could be fabricated in an uninterrupted operation by the droplet ejecting printer 415. The sub-layer 430 can be provided with a different hardness than the polishing layer 405 by using a different precursor and/or a different amount of curing, for example, a different intensity or duration of UV radiation. In other embodiments, the sub-layer 430 is fabricated by a conventional process and then secured to the polishing layer 405. For example, the polishing layer 405 can be secured to the sub-layer 430 by a thin adhesive layer such as a pressure sensitive adhesive.

In FIG. 4B, a printhead 430A having a nozzle 435, can be used to dispense a pure liquid thermoset polymer precursor, while a printhead 430B having a nozzle 435 may be used to liquid thermoset polymer precursor or a molten thermoplastic having abrasive particles 445 contained therein. The abrasive particles 445 may be dispensed only at selected locations on the polishing article 123. These selected locations collectively form the desired printing pattern of the abrasive particles and can be stored as a CAD-compatible file that is then read by an electronic controller (e.g., the controller 311) that controls the droplet ejecting printer 415. Electronic control signals are then sent to the droplet ejecting printer 415 to dispense the premixed mixture only when the nozzle 435 is translated to the position specified by the CAD-compatible file. Examples of particles 445 may include porogens such as polyethylene glycol (PEG), polyethylene oxide (PEO), hollow particles/microspheres (in sizes of about 5 nm to about 50 µm), e.g., gelatin, chitosan, $Si_3N_4$, polymethylmethacrylate (PMMA); mesoporous nanoparticles, carboxyl methyl cellulose (CMC), macroporous hydrogels and emulsion microspheres. Alternatively, a leeching technique can be employed by the combination of a salt particulate (NaCl) and PEG as co-porogens.

Alternatively, instead of using a liquid thermoset polymer precursor, the abrasive particles 445 can be premixed with a molten thermoplastic. In this embodiment, the mixture with abrasive particles 445 is also continuously agitated prior to being dispensed. After the mixture is dispensed from the droplet ejecting printer 415 according to a desired printing pattern, the molten portion of the mixture cools and solidifies, and the abrasive particles 445 are locked in place. The continuous agitation of the mixture ensures fairly uniform distribution of the abrasive particles 445 in the precursor material. This can result in a more uniform distribution of particles 445 through the polishing layer, which can lead to improved polishing uniformity and can also minimize agglomeration.

Similar to the case when liquid thermoset polymer precursor is used, the thermoplastic mixture can be uniformly dispensed to produce a uniform distribution of abrasive particles 445 across the entire polishing layer 405. Alternatively, the thermoplastic mixture containing the abrasive particles can be dispensed only at selected locations of the polishing layer 405, according to a desired printing pattern of the abrasive particles 445 that is stored as a CAD-compatible file and read by an electronic controller used to drive the droplet ejecting printer 415.

Rather than dispensing abrasive particles in a suspension from the nozzle 435 coupled to the printhead 430B, abrasive particles can be dispensed directly in powder form from the nozzle 435 of the printhead 430B, while the nozzle 435 of the printhead 430A is used to dispense the pad polymer precursor. In one embodiment, the polymer precursor is dispensed before the abrasive particles 445 are dispensed into the deposited polymer material, and the mixture is then subsequently cured.

Although 3D printing is particularly useful to construct polishing articles 123 using abrasive particles 445, for example, alumina, ceria, and others, that would be prone to agglomeration when present in conventionally constructed polishing articles, 3D printing can also be used to dispense and incorporate other polishing particles with the polishing articles 123. Thus, the abrasive particles incorporated into the polishing articles 123 can include silica, ceramic oxides, metals and hard polymers.

The droplet ejecting printer 415 can deposit particles 445 that are either solid or particles 445 that have a hollow core. The droplet ejecting printer 415 can also dispense different types of particles, some of which can undergo chemical reactions during CMP processing to produce desired changes on layer or layers of the polishing article 123 as well a chemical reactions with a substrate that is being polished. Examples of chemical reactions used in CMP processing include chemical processes that occur within the basic pH range of 10-14 that involve one or more of potassium hydroxide, ammonium hydroxide and other proprietary chemical processes used by manufactures of slurry. Chemical processes that occur within an acidic pH range of 2-5 involving organic acids such as acetic acid, citric acid are also used in CMP processing. Oxidization reactions involving hydrogen peroxide are also examples of chemical reactions used in CMP processing. Abrasive particles 445 can also be used to provide mechanically abrasive functions. The particles 445 can have sizes up to 1 millimeter, or less, such as 10 microns, or less, for example 1 micron, or less. The particles 445 can have different morphology, for example, the particles 445 can be round, elongated or faceted.

The 3D printing approach allows tight tolerances to be achieved in patterns of the polishing layer 405 and high tolerances in the distribution of abrasive particles 445 that are embedded in the polishing layer 405 due to the layer-by-layer printing approach.

Polishing Articles

FIGS. 5A and 5B depict one embodiment of a polishing article 500 that may be used on the platen assembly 132 of FIG. 2. A polishing surface 505 of the polishing article 500 comprises a plurality of strips or tiles 532 forming the patterned surface 328 of FIGS. 3A and 3B. The tiles 532 are separated by grooves 530 formed in or through a polishing material 570. The polishing material 570 may be adhered to a carrier film, such as a backing material 522. In one embodiment, at least the polishing surface 505 may be manufactured by a 3D printing process as described in FIGS. 3A-4B. The polishing surface 505 may be bound to the backing material 522 by a suitable adhesive 319 that is chosen for resistance to chemical and physical elements used in CMP processes. In some embodiments, one or both of the backing material 522 and the adhesive 319 may be manufactured by a 3D printing process as described in FIGS. 3A-4B.

Each of the plurality of tiles 532 may be connected to another tile 532 by forming the grooves 530 in the polishing material 570 to a depth that is less than the thickness of the polishing material 570. The depth of the grooves 530 may be selected to allow flexibility of, while maintaining integrity in, the polishing material 570. In the embodiment depicted in FIGS. 5A and 5B, the grooves 530 and the tiles 532 are substantially parallel to the cross-machine direction, i.e., transverse to the supply and take up roll direction. The grooves 530 form channels that may enhance slurry retention and delivery to the substrate surface. The grooves 530 are also used to break the surface tension of the polishing material 570, which may be add pliability to facilitate rolling of the polishing article 500 off of a supply roll and onto a take up roll.

In the embodiment shown in FIG. 5A, the tiles 532 are substantially rectangular and are substantially the length of a cross-machine width of the backing material 522. Other embodiments are contemplated, such as two substantially rectangular tiles 532 formed in a length substantially half of a cross-machine width of the backing material 522. In one embodiment, the tiles 532 may be formed such that the polishing article 500 is manufactured with a light or electromagnetic radiation transparent portion 536. The transparent portion 536 may be formed along the length (in the machine direction) of the polishing article 500. The backing material 522, which is also transparent to light or electromagnetic radiation emitted by an optical sensing device 220 (shown in FIG. 2), may be used to facilitate endpoint detection. The width, i.e., the dimension substantially perpendicular to the length, of the tiles 532 may be formed to any dimension. As one example, the tiles 532 may have a width of about 1 inch, or less.

In some embodiments, the polishing material 570 comprises a composite material such as a first material 515 disposed within a second material 520. The second material 520 may be a polymer matrix and the first material 515 may be microelements that are mixed in the first material 515 in one embodiment. The microelements may be a polymeric material, a metallic material, a ceramic material, or combinations thereof. The mean diameter of at least a portion of the microelements may be about 10 nanometers, although a diameter greater than or less than 10 nanometers may be used. The mean diameter of the microelements may be substantially the same or may be varied, having different sizes or mixtures of different sizes, and may be impregnated in the polymeric matrix, as desired. Each of the microelements may be spaced apart at a mean distance of about 0.1 micron to about 100 microns. The microelements may be substantially uniformly distributed throughout the polymeric base material.

The first material 515 may have a different reactivity with electromagnetic energy, such as a beam or beams of energy from the energy source 212 (shown in FIG. 2) when compared with the second material 520. The different reactivity may be used to form a micro texture on the polishing surface 505. The different reactivity between the first material 515 and the second material 520 may provide that the first material 515 will be ablated at a greater rate that the second material 520, or vice versa. The polymer microelements may be micron sized or nano sized materials that form micron sized or nano sized domains within the polishing surface 505 of the polishing article 500. Each of the microelements may include a mean diameter which is less than about 150 microns to about 10 microns, or less.

FIGS. 6A and 6B depict another embodiment of the polishing article 600 that may be used on the platen assembly 132 of FIG. 2. The polishing article 600 has a polishing surface 605 forming the patterned surface 328 of FIGS. 3A and 3B. The polishing surface 605 comprises a plurality of strips or tiles 632 separated by adjacent transverse grooves 630 formed in or through a polishing material 670 and adhered to a backing material 522. In this embodiment, the polishing material 570 includes a plurality of particles 445, as described in FIG. 4B, intermixed therein. Each of the plurality of strips or tiles 632 may be connected to each other by forming each of the grooves 630 in the polishing material 670 to a depth that is less than the thickness of the polishing material 670. The depth of the grooves 630 may be selected to allow flexibility in, while maintaining integrity of, the polishing material 670. Alternatively, the polishing material 670 may exhibit a modulus of elasticity or other mechanical attributes to facilitate movement in a roll format that obviates the need for the backing material 522. In this embodiment, the plurality of tiles 432 may be formed by the plurality of grooves and used in a roll format without an adhesive 319 and the backing material 522. As another alternative, the polishing material 570 may be formed such that the grooves 630 form a tile 632 that is separate or discrete, and is bound to the backing material 522 by a suitable adhesive 519. In the embodiment depicted, the polishing article 600 has corresponding lateral grooves 635, which are added to aid in slurry retention and delivery to the substrate, and to enhance flexibility of the polishing article 600.

The tiles 632 may be any shape and dimension to facilitate efficient polishing. In one embodiment, the tiles 632 may be formed such that the polishing article 600 is manufactured with a light or electromagnetic radiation transparent portion 636. The transparent portion 636 may be formed along the length (in the machine direction) of the polishing article 600. The backing material 522, which is also transparent to light or electromagnetic radiation emitted by an optical sensing device 220 (FIG. 2), may be used to facilitate endpoint detection.

FIGS. 7A and 7B depict another embodiment of a polishing article 700 that may be used on the platen assembly 132 of FIG. 2. The polishing article 700 has a polishing surface 705 forming the patterned surface 328 of FIGS. 3A and 3B. The polishing surface 705 includes a plurality of pores 732 formed in the polishing material 570. The polishing material 570 may be bound to the backing material 522 by a suitable adhesive 519 that is chosen for resistance to chemical and physical elements used in CMP processes. The pores 732 in the polishing article 123 are substantially circular or oval shapes, but may comprise other annular geometric shapes, such as a cone or hollow frustum i.e., a cone between substantially parallel planes. As in other embodiments, a lateral portion 736 may be transparent to allow monitoring of a substrate by an optical sensing device 220 (FIG. 2).

In one embodiment, the pores 732 may be hollow (i.e., empty space) that are sized and/or spaced to enhance slurry retention and aid in rolling of the polishing article 700. In other embodiments, the pores 732 may be filled at least partially with a first material 710 that is different that the polishing material 570 (a second material 712). The first material 710 may be a polymer material that has a different reactivity to a curing method as compared to the second material 712. For example, the second material 712 may be curable with UV energy while the first material 710 is not significantly affected by UV energy. However, the first material 710 may be cured thermally in one embodiment. In one embodiment, the polishing article 700 may be differentially cured using the first material 710 and the second material 712. In one example of differential curing, the first material 710 and the second material 712 of the polishing article 700 may be cured with UV energy that does not cure the first material 710. This may make the second material 712 harder than the first material 710 which may add compressibility and/or flexibility to the polishing article 700 as the first material 710 in more viscous than the second material 712.

In one embodiment, the first material 710 is thermally cured to make the pores 732 having the first material 710 therein harder, but softer and more compressible than the second material 712. In another embodiment, the first material 710 in the pores 732 is cured thermally by heat produced by friction during a substrate polishing process. In this embodiment, the first material 710 may be cured to be harder than the second material 712 thus forming domains on the polishing surface 705 that are harder than the surrounding second material 712.

In other embodiments, the first material 710 may have a different reactivity with electromagnetic energy, such as a beam or beams of energy from the energy source 212 (shown in FIG. 2) when compared with the second material 712. The different reactivity may be used to form a micro texture on the polishing surface 705. The different reactivity between the first material 710 and the second material 712 may provide that the first material 710 will be ablated at a greater rate than the second material 712, or vice versa. The pores 732 may be micron sized or nano sized materials that form micron sized or nano sized domains within the polishing surface 705 of the polishing article 700. In one embodiment, the pores 732 may include a mean diameter which is less than about 150 microns to about 10 microns, or less.

In the above embodiments of the polishing articles 123, 500, 600 or 700, the backing material 317 or 522 is a plastic material, such as a polyester film, for example biaxially-oriented polyethylene terephthalate or polyethylene terephthalate material, that may be formed by a 3D printing process or as a base material in a 3D printing process. The backing material 317 or 522 may be provided at a thickness of about 0.002 inches (50.8 µm) to about 0.012 inches (304.8 µm), for example, about 0.004 inches (101.6 µm). The patterned surface 328 and the polishing material 570, 670 or 770 may be a polymeric material with a hardness in a range of about 20-80 on the Shore D scale. In a one embodiment, the thickness of the polishing article 123 is between about 0.019 inches (482.6 µm) to about 0.060 inches (1.524 µm).

Figure 8:
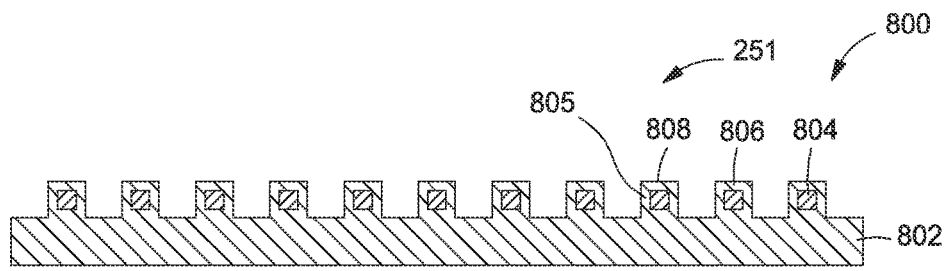
FIG. 8 is a schematic perspective sectional view of a polishing article according to another embodiment of the present disclosure.

FIG. 8 is a schematic perspective sectional view of a polishing article 800 that may be used as the polishing article 123 on the platen assembly 132 of FIG. 2. The polishing article 800 includes a composite pad body 802 which may be a base material layer formed from a soft material intermixed with hard features 804. The composite pad body 802 may be formed by 3D printing. A plurality of raised features 806 may include one or more layers of soft material 805 at least partially surrounding the hard features 804. In one embodiment, the hard features 804 may have a hardness of about 40 Shore D scale to about 90 Shore D scale. The soft material 805 as well as the remainder of the composite pad body 802 may have a hardness value between about 26 Shore A scale to about 95 Shore A scale.

The composite pad body 802 includes plurality of layers, each layer including regions of a first material for the soft material 805 and regions of a second material for the hard features 804 that may be deposited by a 3D printer. The plurality of layers may then be cured, for example by UV light, by a heat source, or electromagnetic energy to solidify and achieve a desired hardness. After deposition and curing, the hard features 804 and the soft material 805 are joined together to form a unitary composite pad body 802.

The soft material 805 may be formed from the first material having a lower hardness value and a lower value of Young's modulus while the hard features 804 may be formed from the second material having a higher hardness value and a higher value of Young's modulus.

The hard features 804 may be formed from a polymer material, for example, polyurethane, acrylate, epoxy, acrylonitrile butadiene styrene (ABS), polyetherimide, polyamides, melamines, polyesters, polysulfones, polyvinyl acetates, fluorinated hydrocarbons, and the like, and mixtures, copolymers and grafts thereof. In one embodiment, the hard feature may be formed from a simulating plastic 3D printing material such as polyether ketones (PEEK), polyphenylsulfone (PPS), polyoxymethylene (POM), and the like. The hard feature may also be provided by precursor materials and/or urethanes can be engineered to be the hard features. In one embodiment, abrasive particles may be embedded in the hard features 604 to enhance polishing. The abrasive particles may be a metal oxide, such as ceria, alumina, silica, or a combination thereof, polymeric, intermetallic or ceramics.

The soft material 805 may be formed from an elastomer material, for example, elastomeric polyurethanes. In one embodiment, the soft material 805 may be formed from a rubber-like 3D printing material, such as polybutadiene, isoprene, chloroprene, EPDM, and the like. The elastic feature may also be provided by precursor materials and/or urethanes can be engineered to be rubbery to provide the elastic features.

In one embodiment, the raised features 806 may in a linear pattern, a rectangular pattern of be in a concentric ring or a line pattern. Grooves 818 are formed between the raised features 806. During polishing, the upper surfaces 808 of the raised features 806 form a patterned surface 251 that contacts the substrate, while the grooves 818 retains polishing fluid.

In one embodiment, a width of the raised features 806 may be about 250 microns to about 2 millimeters. A pitch between the raised features 806 may be about 0.5 millimeters to about 5 millimeters. Each raised feature 806 may have a width of about 250 microns to about 2 millimeters and may include the same pitch, or the width and/or the pitch may vary across a radius of the polishing article 800 to provide zones of varied hardness.

Compared with other polishing articles, the composite polishing article 800 of the present disclosure has several advantages. Traditional polishing articles generally include a polishing layer with a textured polishing surface and/or an abrasive materials supported by a sub pad formed from a soft material, such as a foam, to obtain desired hardness or Young's modulus for polishing substrates. By selecting materials of various Young's modules, adjusting dimensions of the features or varying arrangements of the different features with the use of 3D printing, a desirable hardness or Young's modulus may be achieved in the composite pad body 802 without using a sub pad. Therefore, the polishing article 800 reduces cost of ownership by eliminating sub pads. Additionally, hardness and abrasiveness of the polishing article 800 may be tuned by mixing features with different hardness and abrasiveness, therefore, improving polishing performance.

Composite polishing articles according to the present disclosure may have variable Young's modulus across surface features, such as the hard features 604, and base material, such as the soft material 805, by pattern variation and/or feature size variation. Young's modulus across the polishing pads may be symmetric or non-symmetric, uniform or non-uniform to achieve desired properties. Patterning of the raised features 806 may be radial, concentric, rectangular, or random according to achieve desired property.

Outer surfaces 808 of the raised features 806 are formed from a polymer material that is softer or more elastic than the hard features 804. In one embodiment, the outer surface 808 of the raised features 806 may be formed from the same material as the base material layer 802. In some embodiments, the raised features 806 include the hard feature 804 embedded therein. The embedded hard features 804 provide hardness and rigidity desired for polishing. The soft polymeric layer of the outer surface 808 may reduce defects and improve planarization on the substrate being polished. Alternatively, a soft polymer material may be printed on surfaces of other polishing pads of the present disclosure to provide the same benefit.

Figure 9:
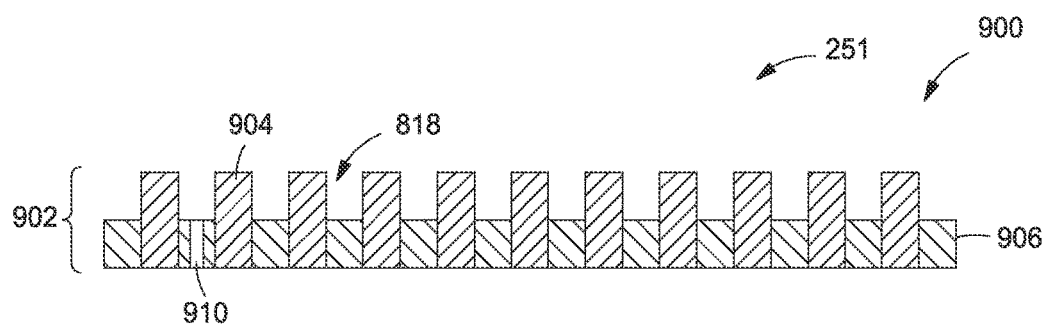
FIG. 9 is a schematic perspective sectional view of another embodiment of a polishing article having an observation window.

FIG. 9 is a schematic perspective sectional view of a polishing pad 900 having an observation window 910 similar to the electromagnetic radiation transparent portion 536 described in FIG. 5A. The polishing pad 900 may be used as the polishing article 1223 on the platen assembly 132 of FIG. 2 as well as other embodiments of polishing pads as described herein. A composite pad body 902 includes one or more hard features 904 and one or more elastic features 906. The hard features 604 and the elastic features 606 are discrete features that are joined together at boundaries to form the composite pad body 602 and may include the materials described above with the soft material 805 and the hard features 804.

The polishing pad 900 may include one or more elastic features 906 and a plurality of hard features 904 extending from the elastic features 906. In one embodiment, the hard features 904 may have a hardness of about 40 Shore D scale to about 90 Shore D scale. The elastic features 906 may have a hardness value between about 26 Shore A scale to about 95 Shore A scale. The hard features 904 may be arranged in any suitable patterns according to the present disclosure.

The observation window 910 may be formed from a transparent material to provide monitoring of a substrate being polished. The observation window 910 may be formed through the elastic feature 906 or the hard features 904. In one embodiment, the observation window 910 may be formed from a transparent 3D printing photopolymer. In one embodiment, the observation window 910 may be formed from UV transmissible polyurethane acrylates, polyester acrylates, polyether acrylates, polymethylmethacrylate (PMMA).

Figure 10:
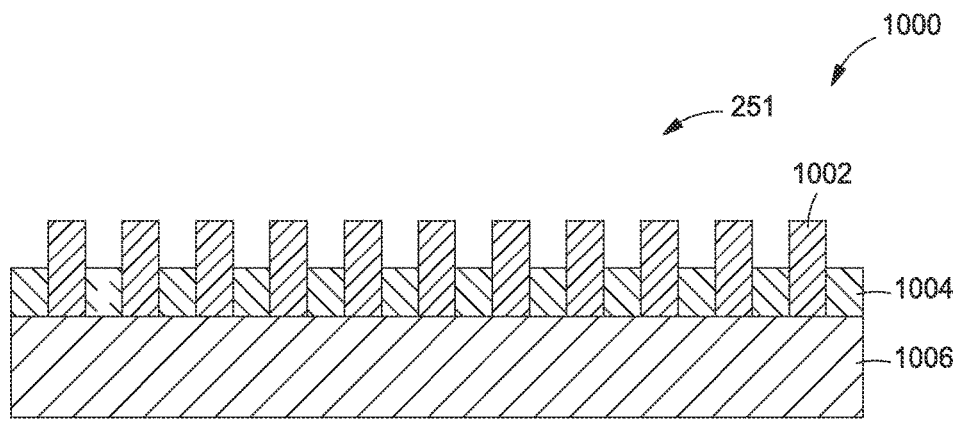
FIG. 10 is a schematic sectional view of another embodiment of a polishing article including a backing layer.

FIG. 10 is a schematic sectional view of a polishing article 600 including a backing layer 1006. The polishing pad 1000 may be used as the polishing article 1223 on the platen assembly 132 of FIG. 2 as well as other embodiments of polishing pads as described herein. The polishing pad 1000 includes a base material layer 1004 and a plurality of surface features 1002 protruding from the base material layer 1004. The polishing pad 1000 may be similar to the polishing articles 500, 600, 700, 800 or 900 described above with the exception of having the backing layer 1006 attached to the base material layer 1004. The backing layer 1006 may provide compressibility to the polishing article 1000. The backing layer 1006 may have a hardness value of less than 80 Shore A scale, in one embodiment.

In one embodiment, the backing layer 1006 may be formed from an open-cell or a closed-cell foam, such as polyurethane or polysilicone with voids, so that under pressure, the cells collapse and the backing layer 1006 compresses. In another embodiment, the backing layer 1006 may be formed from natural rubber, ethylene propylene diene monomer (EPDM) rubber, nitrile, or polychloroprene (neoprene).

Figure 11:
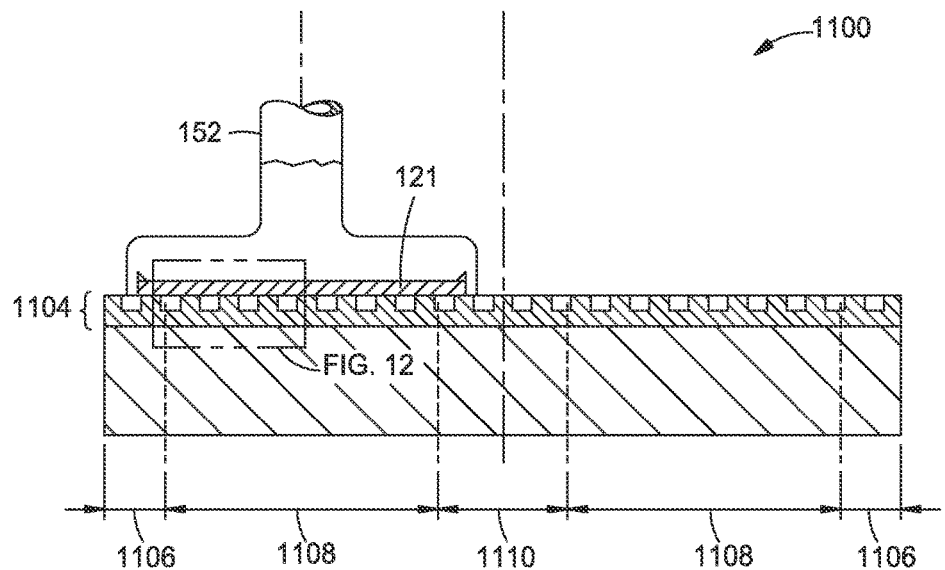
FIG. 11 is a schematic sectional view of another embodiment of a polishing article having multiple zones.

FIG. 11 is a schematic sectional view of a polishing article 1100 having multiple zones. The polishing article 1100 may be designed to have different properties in regions contacting a central area of a substrate 121 than regions contacting peripheral portions of the substrate 121 during polishing. FIG. 11 schematically illustrates the carrier head 152 positioning the substrate 121 relative to the polishing article 1100. In one embodiment, the polishing article 1100 may include a composite pad body 1102 disposed on a backing layer 1104. The composite pad body 1102 may be manufactured by a 3D printing process. As shown in FIG. 11, the polishing pad 1100 may be divided into an outer edge zone 1106, an inner edge zone 1108 along the radius thereof, and a central zone 1110. The outer edge zone 1106 and the inner edge zone 1108 contact the edge region of the substrate 114 during polishing while the central zone 1110 contacts the central region of the substrate 114 during polishing.

The polishing pad 1100 has a different modulus on the edge zones 1106, 1108 as compared to the central zone 1110, to improve edge polishing quality. In one embodiment, the edge zones 1106, 1108 may have a lower Young's modulus than the central zone 1110.

Figure 12:
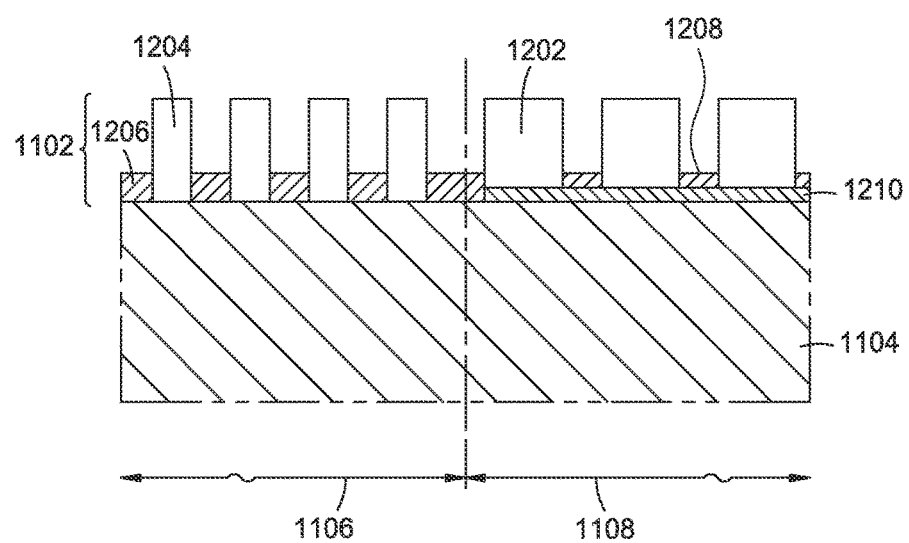
FIG. 12 is a partial enlarged sectional view of the polishing article of FIG. 11.

FIG. 12 is a partial enlarged sectional view of the polishing article 1100 of FIG. 11 showing an exemplary design for the edge zone 1106 and the inner edge zone 1108. The edge zone 1106 includes a base material layer 1206 and a plurality of surface features 1202. The surface features 1204 may be formed from materials harder than the base material layer 1206. The inner edge zone 1108 includes a base material layer 1208 and a plurality of surface features 1204. The surface features 1202 may be formed from materials harder than the base material layer 1208. In one embodiment, the central zone 1108 may include a locking layer 1210 under the base material layer 1208. The locking layer 1210 may be formed from a hard material. The plurality of surface features 1204 may be printed on the locking layer 1210 to improve stability. As shown in FIG. 12, the surface features 1202 in the inner edge zone 1108 are larger in size than the surface features 1204 in the outer edge zone 1106. In one embodiment, the pitch of the surface features 1204 in the edge zone 1106 may be less than the pitch of the surface features 1202 in the inner edge zone 1108.

While the foregoing is directed to embodiments of the present disclosure, other and further embodiments of the disclosure may be devised without departing from the basic scope thereof, and the scope thereof is determined by the claims that follow.

The invention claimed is:

1. A polishing article, comprising:
a composite pad body comprising:
a plurality of polishing features forming a polishing surface, wherein the plurality of polishing features are formed from a first polymer material and each of the plurality of polishing features are separated by a groove; and
one or more base features formed from a second polymer material, wherein the one or more base features surround the plurality of polishing features to form a unitary body and the first polymer material has a hardness greater than a hardness of the second polymer material.

2. The polishing article of claim 1, wherein the first polymer material has a different reactivity with electromagnetic energy when compared with the second polymer material.

3. The polishing article of claim 1, wherein the second polymer material is a polymer matrix and the first polymer material comprises a plurality of microelements that are dispersed in the first polymer material.

4. The polishing article of claim 3, wherein a portion of the microelements further comprise a metallic material, a ceramic material, or combinations thereof.

5. The polishing article of claim 3, wherein each of the microelements include a mean diameter of about 150 microns to about 10 microns, or less.

6. The polishing article of claim 1, wherein the composite pad body is disposed on a base film.

7. The polishing article of claim 6, wherein the base film is transparent to electromagnetic energy.

8. A replacement supply roll for a chemical mechanical polishing process, comprising:
a rod having a polishing article wound thereon, the polishing article comprising:
a composite pad body, comprising:
a plurality of polishing features forming a polishing surface, wherein the plurality of polishing features are formed from a first polymer material and each of the plurality of polishing features are separated by a groove; and
one or more base features formed from a second polymer material, wherein the one or more base features surround the plurality of polishing features to form a unitary body and the first polymer material has a hardness greater than a hardness of the second polymer material.

9. The supply roll of claim 8, wherein the first polymer material has a different reactivity with electromagnetic energy when compared with the second polymer material.

10. The supply roll of claim 8, wherein the second polymer material is a polymer matrix and the first polymer material comprises a plurality of microelements that are dispersed in the first polymer material.

11. The supply roll of claim 10, wherein a portion of the microelements further comprise a metallic material, a ceramic material, or combinations thereof.

12. The supply roll of claim 10, wherein each of the microelements include a mean diameter of about 150 microns to about 10 microns, or less.

13. The supply roll of claim 8, wherein the composite pad body is disposed on a base film that is transparent to electromagnetic energy.

14. A polishing article, comprising:
a composite pad body comprising:
a base material layer comprising a polymer material; and
a plurality of polishing features extending from the base material layer and forming a polishing surface, wherein the plurality of polishing features comprise a polymer material having a hardness greater than a hardness of the base material layer, wherein each of the plurality of polishing features is separated by a groove.

15. The polishing article of claim 14, wherein the first polymer material has a different reactivity with electromagnetic energy when compared with the second polymer material.

16. The polishing article of claim 14, wherein the second polymer material is a polymer matrix and the first polymer material comprises a plurality of microelements that are dispersed in the first polymer material.

17. The polishing article of claim 16, wherein a portion of the microelements further comprise a metallic material, a ceramic material, or combinations thereof.

18. The polishing article of claim 16, wherein each of the microelements include a mean diameter of about 150 microns to about 10 microns, or less.

19. The polishing article of claim 14, wherein a pitch of the polishing features varies across a radius of the composite pad body.

* * * * *